Figure 8:
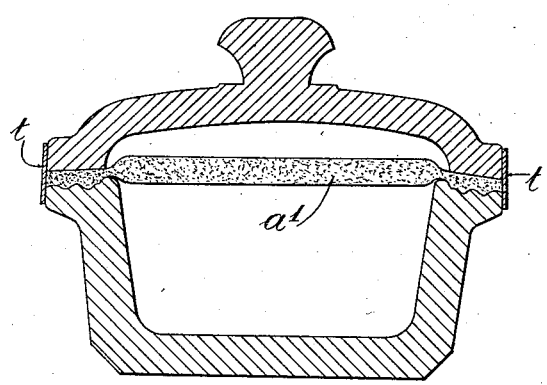

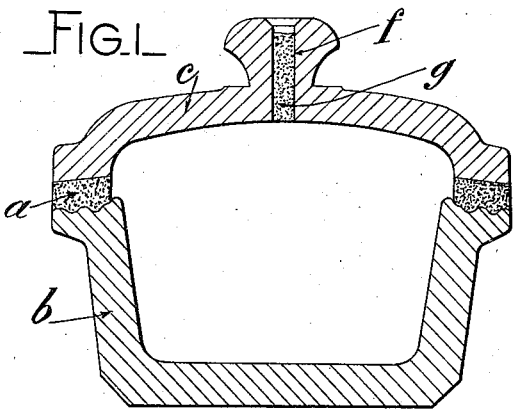
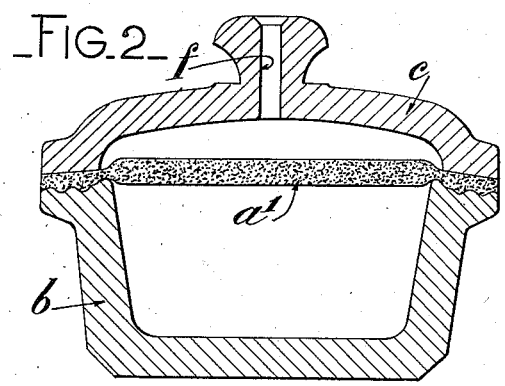
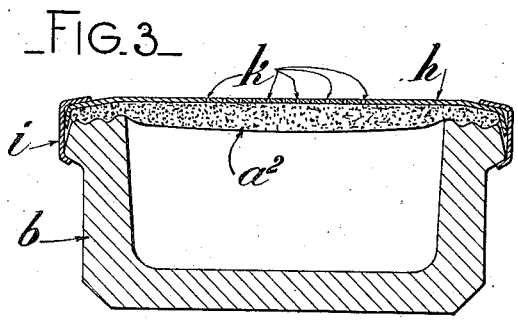

C. JOVIGNOT.
MEANS FOR STERILIZING AND PRESERVING ALIMENTARY PRODUCTS.
APPLICATION FILED JAN. 9, 1914.
1,183,986. Patented May 23, 1916.
4 SHEETS—SHEET 2.
_FIG.4_
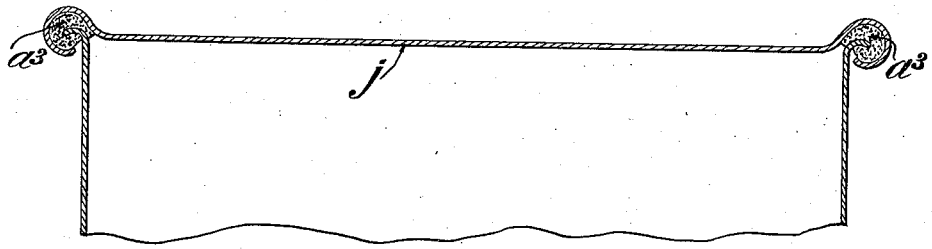
_FIG.5_
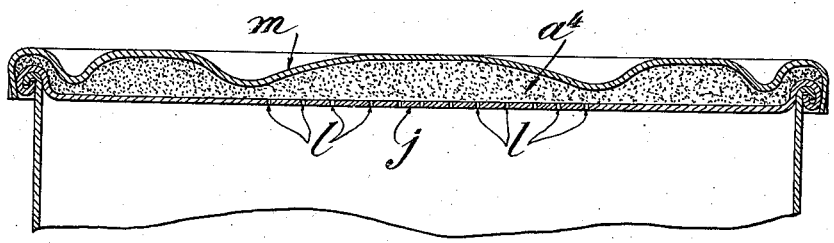
_FIG.6_
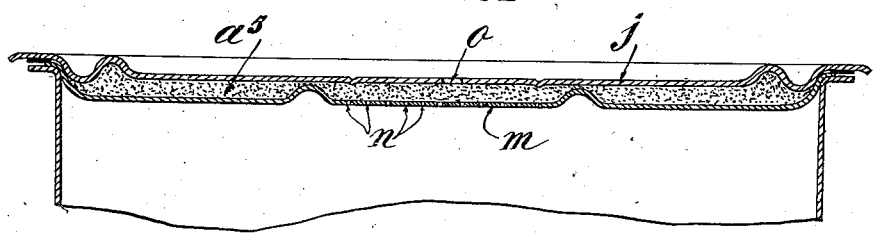
_FIG.7_
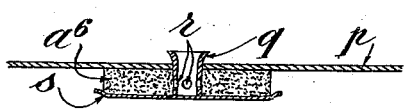
WITNESSES:
John C. Sanders
Albert F. Pteuman
INVENTOR:
Charles Jovignot
By Wm Wallace White
ATTY.

C. JOVIGNOT.
MEANS FOR STERILIZING AND PRESERVING ALIMENTARY PRODUCTS.
APPLICATION FILED JAN. 9, 1914.

1,183,986.  Patented May 23, 1916.
4 SHEETS—SHEET 3.

C. JOVIGNOT.
MEANS FOR STERILIZING AND PRESERVING ALIMENTARY PRODUCTS.
APPLICATION FILED JAN. 9, 1914.
1,183,986.
Patented May 23, 1916.
4 SHEETS—SHEET 4.
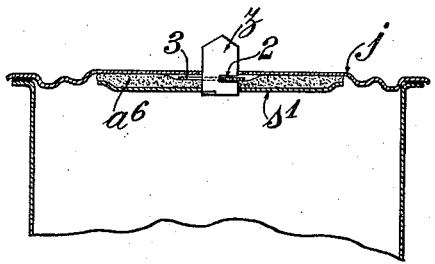
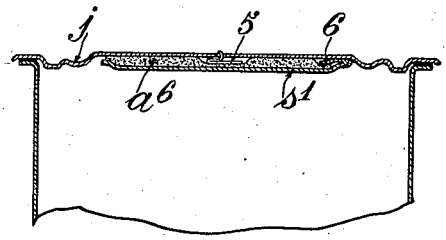
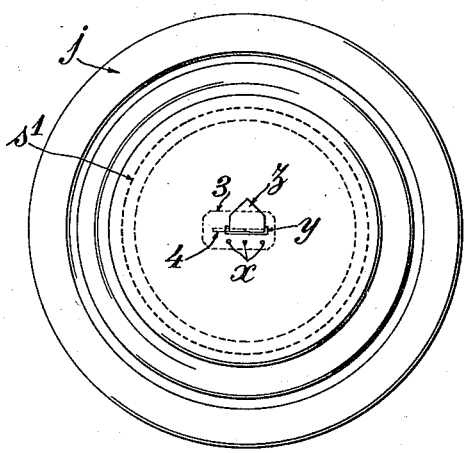
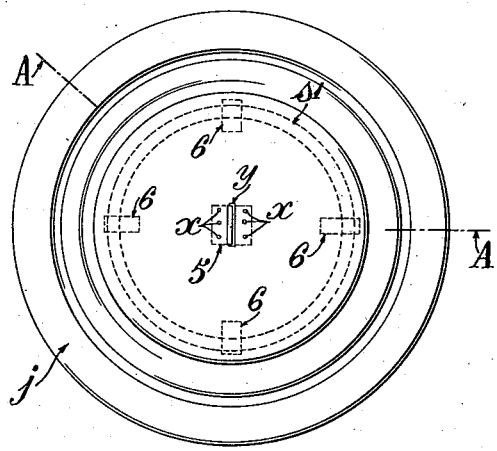
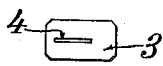
WITNESSES:
John C. Sanders
Albert F. Heuman
INVENTOR:
Charles Jovignot
BY Wallace White
ATTY.

UNITED STATES PATENT OFFICE.

CHARLES JOVIGNOT, OF PARIS, FRANCE.

MEANS FOR STERILIZING AND PRESERVING ALIMENTARY PRODUCTS.

1,183,986.   Specification of Letters Patent.   Patented May 23, 1916.

Application filed January 9, 1914. Serial No. 811,156.

*To all whom it may concern:*

Be it known that I, CHARLES JOVIGNOT, citizen of the Republic of France, residing at 23 and 25 Avenue de Chatillon, Paris, in the Republic of France, have invented new and useful Improvements in Means for Sterilizing and Preserving Alimentary Products, of which the following is a specification.

This invention relates to improved devices for sterilizing and preserving alimentary products.

The industrial methods employed for preserving alimentary products comprise the process of sterilization in a closed vessel and the process of sterilization by means of a vacuum. The first of these methods gives rise to differences of pressure which are frequently considerable between the interior and the exterior of the receptacle, thereby entailing numerous well known inconveniences; moreover, it necessitates high temperatures in order to sterilize the contents of the receptacle throughout their entire mass and it inevitably imparts to the products the flavor peculiar to preserves. The second method or vacuum method consists in producing a vacuum prior to or during the sterilization. This method permits of effecting the sterilization at lower temperatures but it necessitates delicate and costly manipulations and frequently expensive apparatus in particular because the means hitherto available do not permit of obtaining a vacuum automatically in metal boxes. Moreover, in this second method, at least in the case of tin cans or boxes the treatment ends in a sterilization in a closed vessel which also imparts to the products the flavor peculiar to preserves which it is desirable to avoid. The way in which the device which forms the object of the present invention is used obviates these various inconveniences.

It consists in leaving the interior of the receptacle containing the product to be sterilized in communication with the exterior through a filtering joint which prevents the product from issuing from the receptacle, but affords a passage for the air, gases and vapors; in immersing the receptacle thus prepared in air or steam at the sterilization temperature so as to produce sterilization, then in allowing the said receptacle to cool slowly in atmospheric air or in an inert gas; the communication with the exterior through the filtering joint can then be obturated if desired in such a manner as to close the receptacle hermetically.

By means of this process the gases and vapors formed in the receptacle during the sterilization can escape freely and the air, or steam forming the sterilization atmosphere can come into direct contact with the product. The result is that equilibrium of temperature between this atmosphere and the product is produced almost instantaneously so that it is no longer necessary to subject the product for so long a period to a high temperature; in addition, the product is more rapidly heated throughout its entire mass to the desired temperature instead of the heat being badly distributed, as has hitherto been the case, in particular with solid products such as meats.

Another advantage resides in the fact that it is no longer necessary to close the receptacle hermetically immediately after the sterilization because owing to the fact that the joint employed affords a passage for the gases and simultaneously exerts a filtering action upon them, the air which is allowed to enter the receptacle after the sterilization will be filtered. This air can however be replaced by an inert gas such as nitrogen.

Figure 9:
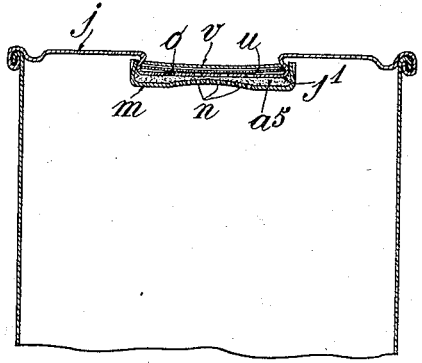

Various devices for carrying the novel method into practice are illustrated by way of example in the accompanying drawing, in which:

Figure 1 is a section of a dish with a china cover provided with a peripheral filtering joint. Fig. 2 shows a dish of the same type provided with a filtering disk. Fig. 3 shows a dish with a metal cover. Figs. 4 to 7 illustrate various devices applicable to metal boxes. Fig. 8 is a vertical section of a dish provided with a closing ring made of an elastic material. Fig. 9 is a vertical section of a preserving can provided with two covers, the inner one having a restricted area. Fig. 10 is a vertical section of a can in which the filtering material is held by means of a metal cup. Fig. 11 is a plan view of the cover of said can; the lug used in said construction being bent upon the cover. Fig. 12 is a detail of a small metallic plate. Figs. 13 and 14 are views similar to Figs. 10 and 11, respectively, of a modified construction, Fig. 13 being a section taken approximately along the line A—A, Fig. 14.

In order to carry out the novel method of sterilization, devices of the following types which are given by way of example only can be employed. In receptacles other than metal boxes or cans, for example glasses, china dishes and the like, the filtering joint can be constituted by a ring or annular washer a (Fig. 1) of cotton, wadding, felt, etc., or a sheet or film of cellulose or any other non-hydrophile hydroscopic material having similar air filtering properties, said material being permeable to gases and steam insoluble and incapable of being disintegrated in liquids. The ring a is merely compressed slightly between the body b of the dish and the cover c. If it is formed of wadding or similar material, it may be arranged between two thin washers or films intended to retain the wadding and to facilitate manipulations of this joint. It can also be entirely surrounded by a sheet or film serving the same purpose as the washers referred to above and also serving to isolate it from the product, but in this case the said enveloping sheet or film should be permeable to gases. The filtering ring may also be oiled to a greater or less extent if necessary. In order to prevent the creation of an appreciable difference of pressure between the interior of the receptacle and the exterior during sterilization, due to the compression of the joint, to the expansion of the product and so forth, the lid c may be provided at the center of the knob e with a hole f obturated by a filtering plug g, which is but slightly compressed during the sterilization and after the sterilization has been effected the hole may be tightly closed. The filtering joint may also be in the form of a solid disk as shown at a' in Fig. 2. This disk can also be inclosed between two sheets or films permeable to gases.

Fig. 3 shows a filtering joint formed by a disk $a^2$ applied to a glass receptacle b closed by a metal lid h held by a seamed ring i. In this case, the lid h can be provided with capillary holes k in order to avoid the formation of any excess pressure inside the receptacle.

In order to obtain, when desirable, a complete and definitive obturation of the receptacle, for the purpose of avoiding any inflow of air after sterilizing, one may proceed as follows: In the case of receptacles or china dishes having a china or glass lid, the filtering joint a' (Fig. 8) being compressed as required, the edges of the receptacle body and the lid which compress the filtering joint may be surrounded by a very thin ring t of a resilient material such as rubber; or by means of a layer of a substance such as paraffin which may be fused, when the receptacle is still hot, between the usual metallic ring and the receptacle wall.

In the case of receptacles having a metallic lid, the holes formed in the lid may be closed by means of a layer of varnish, paraffin, and the like. The varnish or other substance is preferably applied at a temperature sufficiently high to destroy the germs existing on the surfaces, which action may be aided by the special composition of the varnish or other product used.

In metal cans or boxes, the joints hitherto provided are replaced, in accordance with the present invention, by a filtering joint of the type described, at least upon one of its heads (the lid).

j (Fig. 4) designates the usual lid and $a^3$ the filtering joint. This joint is held without compression in the beading formed in the seaming operation, after sterilization the seaming can be completed by passing the box beneath the seaming rollers again.

The metal box or can may also be closed similarly to an ordinary box having a seamed or a soldered lid, but in this case the lid j (Fig. 5) is provided with capillary orifices l. A filtering disk $a^4$ is placed upon this lid and held in place by a supplementary lid m. The edge of this second lid can be waved or corrugated as shown in the drawing, in such a manner that it can be fixed in place merely by pressure. After sterilization, this second lid can be seamed to insure a perfect joint; if necessary it may previously be provided with the joint usually employed in seaming. The supplementary lid m (Fig. 6) can also be placed directly upon the metal box so that it is beneath the ordinary lid j. In this case the supplementary lid may be formed of exceedingly thin metal because it has no other purpose to serve than to support the filtering disk $a^5$. It is perforated with holes n and in the principal upper lid, one or more holes o are formed. After sterilization and when the box is cold these holes can be blocked by means of solder. The method is also applicable to the usual metal boxes or cans by means of the following device. In one of the heads or in the body of the box p (Fig. 7) a hole is formed in which there is fixed a small tube q provided with perforations r in its portion located inside the box. At its inner end this tube is provided with a tin cap s which compresses a filtering disk $a^6$ surrounding the holes r, between itself and the inner face of the wall p. After sterilization has been effected the outer orifice of the tube q can be obstructed by a bead of solder.

According to the construction shown in Fig. 9, the supplementary lid m perforated with capillary holes n is not of a sufficient diameter to be seamed upon the edge of the can, but has a restricted diameter and is fixed upon the usual lid j provided with holes o. The lid j may for instance be provided with an inner central boss $j^1$ and the supplementary lid m may be in the form of a cap provided with a corrugated edge which engages resiliently the boss $j^1$ whereby the cap $m$ is held rigidly in place. The cap $m$ may also be fixed by other means. Between the cap $m$ and the boss $j^1$ of the lid $j$, is interposed the filtering material $a^5$. To close completely the holes $o$, a thin and resilient disk $u$, for instance a rubber disk may be arranged inside the boss $j^1$, said disk having a diameter slightly greater than the inner diameter of the boss, so that it can extend over the whole outer surface of the boss and stop the holes $o$. The resilient disk $u$ may be placed before sterilizing inasmuch as it permits the vapors to escape outwardly during the operation. It will insure automatically the formation of a vacuum in the receptacle after sterilizing. A metal disk $v$ may also be inserted with a slight friction into the cavity of the boss $j^1$ over the resilient disk $u$ to preserve the latter. Said metal disk may be very thin.

When the definitive obturation of the can is to be obtained by means of solder, great difficulties are met in practice when the filtering material is in direct contact with the edges of the orifices to be blocked. To remove said difficulties a metal plate is arranged beneath the holes so that the edges thereof are separated from the filtering material. The arrangement shown in Figs. 10 to 12 may be adopted. In this case, the holes $x$ to be obturated are provided in the lid itself $j$ of the can. Near the holes, the lid has a slot $y$ through which extends a tin band or lug $z$ which is bent (Fig. 11) upon the lid, at the side remote from the holes $x$. The lug $z$ carries at its lower end a cup $s^1$ supporting the filtering material $a^6$. For instance the cup $s^1$ may be provided with a slot similar to the slot $y$ into which the end of the lug $z$ is engaged and secured by being bent over or soldered. The lug $z$ has, a little above the cup $s^1$ a horizontal notch or slot 2 and a small metal plate 3 provided with a central slot 4 (Fig. 12) may be slid over said lug.

For using the device, the filtering material is placed upon the cup by being threaded over the pointed end of the lug $z$ and the plate 3 is slid upon the lug and displaced laterally so as to engage into the notch 2 of the lug. By this means, the filtering means is held by the plate which is itself prevented from sliding along the lug. The lug is then engaged through the slot $y$ of the lid $j$ and its upper end is bent over said lid (Fig. 11) so that the filtering material is held against the under face of the lid. The plate 3 is then below the holes $x$ and when the holes are to be obturated by means of solder, no difficulty is met. The solder acts at the same time, to secure the end of the lug $z$ upon the lid. The lid, together with the cup $s^1$ and the filtering material, the whole being held together by the lug $z$ form a self contained device which may be easily manipulated.

According to the construction shown in Figs. 13 and 14, the tin lug or band 5 extends only on a very small length above the slot $y$ provided in the lid $j$ of the can; and is held in said slot by being bent over the edge thereof. The lid has two rows of perforations $x$. The lug 5 has its lower end bent twice under the lid so as to extend below the holes $x$. The cup $s^1$ in which the filtering material is carried is provided in the cutting out operation, with four extensions or lugs 6 which are bent over the filtering material $a^6$ so that the same is held securely in place and the manipulations are facilitated. The extensions 6 bear against the lower face of the lip and an interval is thereby left between the edge of the cup and the lip for the passage of the gases. The cup is secured to the lid by means of solder. In this case also, no difficulty is met in stopping the holes $x$ by means of solder, owing to the bent end of the lug 5 which separates the lid of the filtering material. The cups may have a more or less deep form, according to the nature of the filtering material. It will be understood that the sterilization process described in the case of metal boxes or of receptacles with metal lids renders it possible to employ thinner metal than that of which such boxes or the like have hitherto been constructed, because they are never subjected to high pressures during sterilization.

In order to carry out the sterilization process with any of these types of receptacles, it is only necessary to place the receptacle thus prepared in a digester containing air or steam at the sterilization temperature. The air or steam can pass through the filtering joint and come directly into contact with the product to be sterilized. At the same time the gases or vapors liberated inside the receptacle are able to escape therefrom in such a manner that the pressure inside the receptacle is equal to the pressure existing inside the digester. As soon as the sterilization has been carried out the receptacles can be left inside the digester and an inert gas under pressure, such as nitrogen can be introduced into the digester. Or the receptacles can be introduced, before they have cooled into a chamber to which the said inert gas is supplied. On cooling, this gas will enter the box through the filtering joint. The employment of inert gas can be dispensed with and atmospheric air can be allowed to reënter the box through the joint which thereby filters the air. At any convenient point of time after the sterilization, the closure of the receptacle can be rendered absolutely hermetic by seaming or soldering, as already explained.

Having now described my invention, what

I claim as new and desire to secure by Letters Patent is:

1. A receptacle for preserves comprising a body, a perforated metal lid secured to the body, a layer of gas filtering material, a thin perforated metal plate adapted to apply the layer of filtering material against the inner face of the lid, and means for fixing the metal plate to the lid, so as to inclose between them the said layer of filtering material, substantially as described and for the purpose set forth.

2. A receptacle for preserves comprising a body, a perforated metal lid secured to the body, a layer of gas filtering material having a smaller surface than the cross section of the receptacle, a thin metal plate having the same surface as that of the layer of filtering material and adapted to apply said layer against the inner face of the lid, and means for fixing the metal plate to the lid so as to press between them the said layer of filtering material, substantially as described and for the purpose set forth.

3. A receptacle for preserves comprising a body, a perforated metal lid secured to the body, a layer of gas filtering material, a thin perforated metal plate adapted to apply the layer of filtering material against the inner face of the lid, a small metal plate arranged beneath the perforated part of the lid at a small distance therefrom and above the layer of filtering material to facilitate the obturation of the perforated part by means of solder and means for fixing the perforated metal plate to the lid, substantially as described and for the purpose set forth.

4. A receptacle for preserves comprising a body, a perforated metal lid secured to the body, a layer of gas filtering material having a smaller surface than the cross section of the receptacle, a thin metal plate having the same surface as that of the layer of filtering material and adapted to apply said layer against the inner surface of the lid, a small metal plate, means for maintaining said small plate beneath the perforated part of the lid at a small distance therefrom and above the layer of filtering material, and means for fixing the thin metal plate to the lid so as to press between them the said layer of filtering material, substantially as described and for the purpose set forth.

In testimony whereof I have signed my name to this specification in the presence of two subscribing witnesses.

CHARLES JOVIGNOT.

Witnesses:
ANTOINE LAVOIE,
HANSON C. COXE.